United States Patent [19]

Otake et al.

[11] Patent Number: 4,759,705
[45] Date of Patent: Jul. 26, 1988

[54] SWITCHING CONTROL SYSTEM FOR UNIT TORQUE LIMIT VALUE OF SERVO MOTOR FOR INJECTION MOLDING MACHINE

[75] Inventors: Hiromasa Otake, Tanashi; Noriaki Neko, Hino, both of Japan

[73] Assignee: Fanuc Ltd, Minamitsuru, Japan

[21] Appl. No.: 2,705

[22] PCT Filed: Apr. 30, 1986

[86] PCT No.: PCT/JP86/00222
§ 371 Date: Dec. 30, 1986
§ 102(e) Date: Dec. 30, 1986

[87] PCT Pub. No.: WO86/06319
PCT Pub. Date: Nov. 6, 1986

[30] Foreign Application Priority Data

Apr. 30, 1985 [JP] Japan .................................. 60-91206

[51] Int. Cl.⁴ .............................................. B29C 45/77
[52] U.S. Cl. ................................ 425/145; 264/40.5; 425/149; 425/170
[58] Field of Search .......................... 264/40.1, 40.5; 425/145, 149, 170

[56] References Cited

U.S. PATENT DOCUMENTS 3,893,792  7/1975  Laczko .............................. 425/149
4,511,319  4/1985  Takayama ........................... 425/145

FOREIGN PATENT DOCUMENTS 224324  12/1984  Japan .

*Primary Examiner*—Jay H. Woo
*Assistant Examiner*—Timothy W. Heitbrink
*Attorney, Agent, or Firm*—Staas & Halsey

[57] ABSTRACT

Disclosed is a switching control system for a unit torque limit value of an injection molding machine servo motor (M) to limit a torque instruction (e) supplied from a servo circuit (8) to the servo motor (M) so as to optimize an injection pressure, a holding pressure, and a back pressure.

During metering as compared with injection, an output level of a D/A converter (9) for receiving the torque limit instruction (g) is set to be smaller by a predetermined value to reduce the unit torque limit level. A unit torque limit value of the back pressure during metering is set to be smaller than the unit torque limit value for injection and holding pressures during injection, thereby setting smaller torque limit values during metering in units of smaller values as compared with the case of injection.

4 Claims, 1 Drawing Sheet

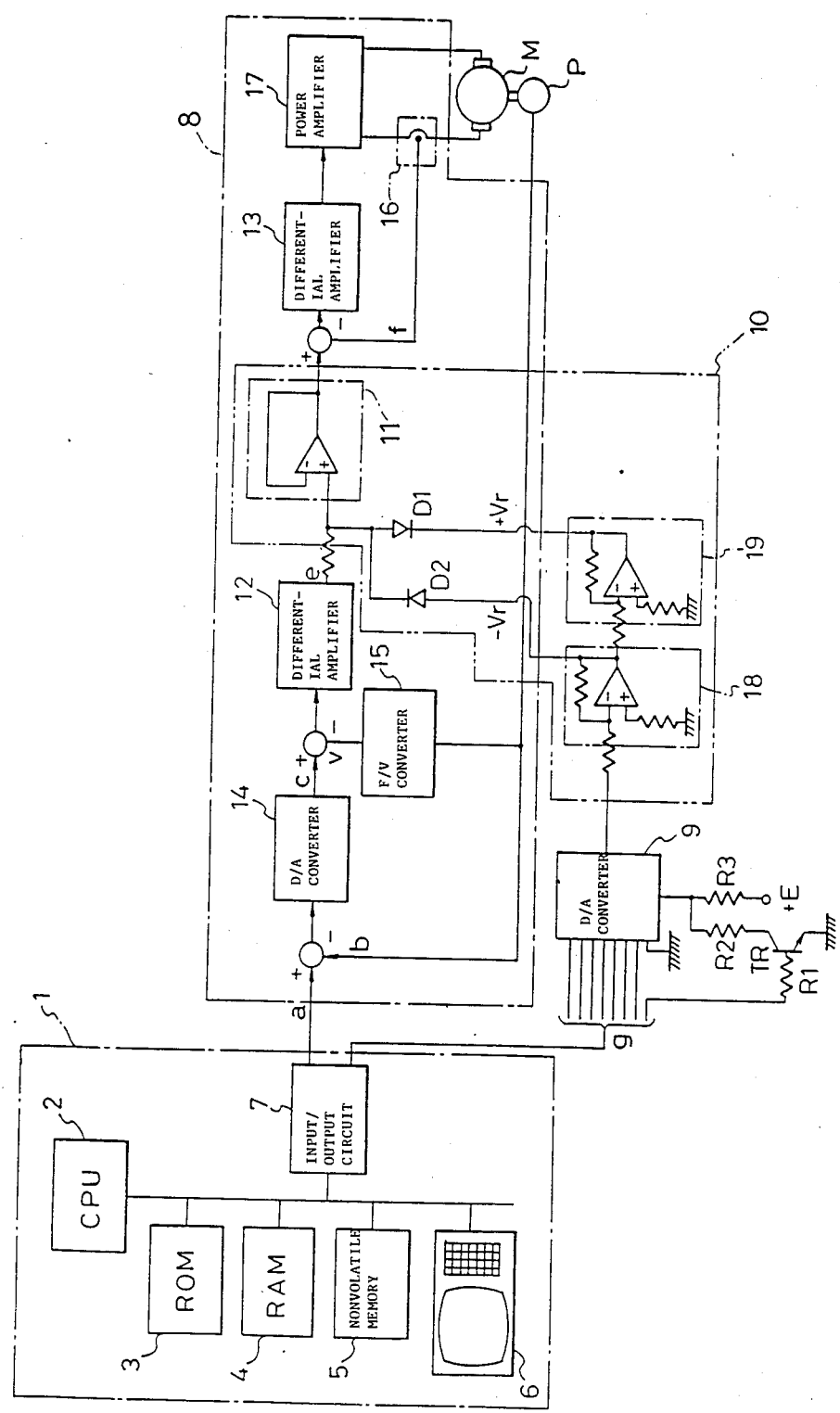

SWITCHING CONTROL SYSTEM FOR UNIT TORQUE LIMIT VALUE OF SERVO MOTOR FOR INJECTION MOLDING MACHINE

BACKGROUND OF THE INVENTION

1. Field of the Invention

The present invention relates to an injection molding machine and, more particularly, to a switching control system for unit torque control value of a servo motor for an injection molding machine which uses a servo motor as a drive source for driving the injection mechanism.

2. Description of the Related Art

In a conventional injection molding machine, hydraulic pressure drives an injection mechanism and axially moves a screw to perform injection. An injection pressure and a back pressure could be adjusted by controlling the hydraulic pressure. On the other hand, injection molding machines in which a servo motor drives the injection mechanism to perform injection have been developed. In these injection molding machines driven by servo motors to perform injection, the injection pressure or the back pressure must be controlled by controlling the output torque of the servo motor. According to a conventional method of controlling the torque of a servo motor, the torque of the servo motor is limited. Although a back pressure during metering is as low as about 1/10 of a maximum injection pressure during injection, a torque limit command representing a large unit value is supplied to a D/A converter from a control unit. Therefore, it was impossible to set a small unit torque limit value during metering.

SUMMARY OF THE INVENTION

It is an object of the present invention to provide a switching control system for a unit torque limit value of a servo motor for an injection molding machine, wherein in response to a torque limit command from a control unit, a unit torque limit value during metering can be set to be smaller than that during injection.

In order to achieve the above object of the present invention, in a control system for an injection molding machine, wherein an injection mechanism is driven by a servo motor to perform injection, a digital torque limit command is converted into an analog signal by a D/A converter, and the torque command supplied from a servo circuit to the servo motor is limited by the analog signal from the D/A converter, a switching control system for a unit torque limit value of a servo motor for an injection molding machine, wherein a level of the output from the D/A converter during metering is set to be smaller by a predetermined value than the level of the output during injection to reduce a unit torque limit value, and a unit limit value of a back pressure during metering is set to be smaller than that of a unit pressure limit value for injection pressure and a holding pressure during injection, thereby allowing setting of a small torque limit value in units of small values.

Thus, in a switch control system for a unit torque limit value of a servo motor for an injection molding machine of the present invention, a torque limit command for a servo motor for driving the injection mechanism changes an output level of the D/A converter for converting the torque limit command into an analog signal to change the torque limit value itself, and can set a torque limit value in substantially the same accuracy in an injection and pressure holding mode as well as a metering mode. Therefore, optimal values for the injection pressure, the holding pressure and the back pressure can be set.

BRIEF DESCRIPTION OF DRAWINGS

The FIGURE is a block diagram of a control system for an injection molding machine according to an embodiment of the present invention.

DESCRIPTION OF THE PREFERRED EMBODIMENTS

An embodiment of the present invention will be described in detail referring to the accompanying drawing. The FIGURE is a block diagram of an embodiment of the present invention. Referring to the drawing, reference numeral 1 denotes a control unit comprising CNC or the like for controlling an injection molding machine (not shown); 2, a central processing unit (to be referred to as a CPU hereinafter); 3, a ROM for storing a control program which controls the entire injection molding machine; 4, a RAM for serving as a temporary memory or the like; 5, a nonvolatile memory for storing a numerical control (NC) program and injection conditions or the like; 6, an MDI/CRT (an operation panel with a display) which inputs various commands and data, and displays an image; 7, an input/output circuit connected to a servo circuit 8 and a digital-analog converter (to be referred as a D/A converter hereinafter) 9 and the like.

A servo motor M drives a screw of the injection molding machine to cause injection. Reference symbol P denotes an incremental pulse encoder.

The servo circuit 8 is substantially the same as a conventionally known servo circuit. The servo circuit 8 is different from such a conventional servo circuit in that a buffer amplifier 11 of a torque limit circuit 10 is arranged between differential amplifiers 12 and 13. Assume that a position command a, which represents a shift value per unit time and consists of a pulse train, is input as a move command for the servo motor M. Then, a difference between the position command a and a shift value b of the servo motor M, which is detected by the pulse encoder P, is converted into an analog voltage as a speed command value c by a D/A converter 14. More specifically, when the difference between the position command a and the shift value b of the servo motor M which is supplied from the pulse encoder P is large, a large speed command value c is output. When the difference between the position command a and the shift value b is small, that is, when the shift value b becomes close to the position command a, a small speed command value c is output. The servo circuit performs speed feedback in order to improve the response time. In accordance with the speed feedback, a signal from the pulse encoder P is converted into a voltage v by an F/V converter 15, the voltage v corresponding to the actual speed of the servo motor M is subtracted from the speed command c, and the obtained difference, i.e., the difference between the command speed c and the actual speed v is amplified by a differential amplifier 12 and output as torque command e. The torque command e output in this manner is output as a voltage corresponding to a current flow to the armature of the servo motor M. The torque command e in the embodiment is output through the buffer amplifier 11 (note that a normal servo circuit does not have this buffer amplifier 11, and directly outputs the torque command e). In order to further improve the response time with respect to the torque command e, a voltage f, supplied from a current detector 16 which detects the armature current of the servo motor M and corresponding to the armature current, is fed back. A difference between the torque command e and the feedback signal f of the armature current is amplified by a differential amplifier 13 and a power amplifier 17, and is used to control the servo motor M.

On the other hand, in the torque limit circuit 10, a torque limit command g representing a digital signal from the control unit 1 or the like is converted by a D/A converter 9 into a current output. The obtained output is converted by a current/voltage converter 18 into a voltage corresponding to the torque limit command value g. The voltage is input, as a voltage $-Vr$ corresponding to the torque limit command value g, to the buffer 11 via a diode D2. The sign of the voltage at the current/voltage converter 18 is converted by a sign converter 19. Thus, the voltage $+Vr$ corresponding to the torque limit command g is input to the buffer amplifier 11 via a diode D1.

The torque limit command g supplied to the D/A converter 9 from the control unit 1 usually consists of 8 bits. According to the embodiment, the torque limit command consists of 7 bits; the remaining 1 bit is used as a switching command for a unit torque limit command value.

A voltage $+E$ is connected to the D/A converter 9 through a resistor R3. A resistor R2 and a transistor TR are connected to one end of the resistor R3. The switching command for a unit torque limit command value is input to a base of the transistor TR via the resistor R1.

The operation of this embodiment will now be described.

Assume that an injection pressure is set according to a screw position or the like by the MDI/CRT 6. As a result, the control unit 1 outputs a torque limit command g in response to the preset injection pressure. Limit voltages $+Vr$ and $-Vr$ are input as torque limit values to the buffer 11 through the diodes D1 and D2. When a position command is input to the servo circuit 14 to perform injection, as described above, a speed command value c is output as a voltage by the D/A converter 14. A difference between the voltage c and a voltage corresponding to an actual speed of the servo motor M is amplified by the differential amplifier 12 to be output as a torque command value e. The torque command value e is output as a voltage corresponding to a current supplied to the armature of the servo motor M. This voltage e is output through the buffer amplifier 11. A difference between the voltage e and a detected output f (voltage) from the current detector 16, which detects the armature current of the servo motor M, is amplified by the differential amplifier 13 and the power amplifier 17, thereby driving the servo motor M, moving the screw forward and performing injection. When the voltage of the torque command value from the differential amplifier 12 is increased to a value exceeding the limit voltage $+Vr$ or $-Vr$ supplied through the current/voltage converter 18, the sign converter 19, and the diodes D1 and D2 and corresponding in its value to the torque limit command g from the control unit 1, the diodes D1 and D2 are turned on. Thus, an input to the buffer amplifier 11 is limited to the limit voltage $+Vr$ or $-Vr$ regardless of the magnitude of the output from the differential amplifier 12 exceeding the limit voltage $+Vr$ or $-Vr$. Therefore, the torque command value is kept equal to or below the limit voltage $+Vr$ or $-Vr$. As a result, the armature current f of the servo motor M is limited by the limit voltage $+Vr$ or $-Vr$ to be saturated at a predetermined value. Therefore, the output of the servo motor M is limited by the torque limit value $+Vr$ or $-Vr$ corresponding to the preset injection pressure, and an injection pressure is limited to a value not more than the preset injection pressure.

During injection, the transistor TR is turned off and a predetermined current is supplied to the D/A converter 9 from a voltage source having a voltage $+E$ through the resistor R3. A current command value corresponding to the torque limit command value g is output with respect to this current value. However, during metering, a switching command for the unit torque limit command value is output from the control unit 1. The transistor TR is turned on and a current is supplied through the resistor R2 and the transistor TR. As the current supplied to the D/A converter 9 is decreased, the output of the D/A converter 9 is also decreased. Therefore, the level of the torque limit command voltage $+Vr$ or $-Vr$ also drops. As a result, the torque limit command voltage $+Vr$ or $-Vr$ can be changed in units of small values in response to the torque limit command value g.

Assume that the resistances of the resistors R2 and R3 are selected so that a current of 1 mA is supplied to the D/A converter 9 when the transistor TR is turned off and that a current of 0.1 mA is supplied to the D/A converter 9 when the transistor is turned on. When the transistor TR is turned on, the D/A converter 9 outputs an analog signal as low as 1/10 of the level of the output obtained when the transistor TR is off.

Assume that a maximum injection pressure during injection is 2,000 kg/cm$^2$. A resolution of the D/A converter 9 can be given as follows:

$$\begin{aligned}\text{Resolution} &= (\text{maximum injection pressure})/2^n \\ &= 2{,}000/2^7 \\ &= 15.6 \text{ kg/cm}^2\end{aligned}$$

Thus, the unit value for setting the torque limit command value g is large. During metering, the back pressure for the maximum injection pressure of 2,000 kg/cm$^2$ is about 200 kg/cm$^2$. If the D/A converter 9 is used in the same manner, the D/A converter 9 can switch the back pressure in only 12 steps (200/15.6=12.8).

However, if an output level of the D/A converter 9 is set, as described above, e.g., at 1/10 level, a resolution of the D/A converter 9 is given as follows:

$$\begin{aligned}\text{Resolution} &= [(\text{maximum injection pressure})/2^n](1/10) \\ &= (2{,}000/2^7)(1/10) \\ &= 1.56 \text{ kg/cm}^2\end{aligned}$$

Since a unit value for setting the torque limit command value g is small, a torque limit command, i.e., a back pressure, can be switched in $2^7=128$ steps.

According to the embodiment, the D/A converter 9 which outputs a current is used. However, a D/A converter which outputs a voltage may be used in place of the D/A converter 9. In this case, the voltage value can be changed by changing a bias voltage supplied to the D/A converter.

In the above embodiment, the servo motor M is constituted by a DC motor. However, an AC motor may be used in place of the DC motor. The detector is constituted by the pulse encoder P. However, other detectors such as a resolver or a tachogenerator may be used in place of the pulse encoder.

We claim:

1. A control system for an injection molding machine, comprising:
   a control unit for issuing a position command and a torque limit command for the injection molding machine;
   a servo motor for driving the injection molding machine;
   a servo circuit for commanding said servo motor based on the position command and the torque command from said control unit, said servo circuit including a buffer amplifier for limiting a torque command;
   a D/A converter for receiving the torque limit command and converting the torque limit command into a current;
   a current/voltage converter for converting the current from said D/A converter into a first voltage corresponding to the torque limit command and having an output connected to said buffer amplifier for supplying said buffer amplifier with the first voltage having a first sign corresponding to the torque limit command value; and
   a sign converter connected to an output of said current/voltage converter for converting the sign of the voltage corresponding to the torque limit command value and supplying a second voltage having an opposite sign from the first voltage to said buffer amplifier, said buffer amplifier limiting the magnitude of the torque command to within the values of the first and second voltages.

2. A system according to claim 1, wherein the level of the output from said D/A converter is changed by changing a value of a current supplied thereto.

3. A system according to claim 1, wherein the level of the output from said D/A converter is changed by changing a value of a voltage supplied thereto.

4. A system according to claim 1, wherein during a metering operation, a voltage source acts to lower output levels from said D/A converter so that the magnitude of the first and second voltages during the metering operation is smaller than that during injection.

* * * * *